United States Patent
Nagashima et al.

(10) Patent No.: US 8,433,166 B2
(45) Date of Patent: Apr. 30, 2013

(54) MULTI-CORE OPTICAL FIBRE

(75) Inventors: Takuji Nagashima, Yokohama (JP); Toshiki Taru, Yokohama (JP); Takashi Sasaki, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/377,868

(22) PCT Filed: Jan. 26, 2011

(86) PCT No.: PCT/JP2011/051392
§ 371 (c)(1),
(2), (4) Date: Dec. 13, 2011

(87) PCT Pub. No.: WO2011/102191
PCT Pub. Date: Aug. 25, 2011

(65) Prior Publication Data
US 2012/0087626 A1 Apr. 12, 2012

(30) Foreign Application Priority Data
Feb. 18, 2010 (JP) ................................. 2010-033776

(51) Int. Cl.
*G02B 6/028* (2006.01)
(52) U.S. Cl.
USPC ........... 385/124; 385/100; 385/114; 385/126; 385/127; 385/128
(58) Field of Classification Search ........... 385/100, 385/114, 126, 127, 128
See application file for complete search history.

(56) References Cited

U.S. PATENT DOCUMENTS 8,041,173 B2 10/2011 Imamura
2010/0099951 A1* 4/2010 Laby et al. .............. 600/144
2011/0110623 A1* 5/2011 Terada et al. ............ 385/14

FOREIGN PATENT DOCUMENTS

| JP | 56-35605 | 4/1981 |
| JP | 58-4324 | 1/1983 |
| JP | 62-27307 | 2/1987 |
| JP | 6-324222 | 11/1994 |
| JP | 11-95049 | 4/1999 |
| JP | 2001-166157 | 6/2001 |
| JP | 2002-525645 | 8/2002 |
| JP | 2004-191748 | 7/2004 |
| WO | 2010/073821 | 7/2010 |

OTHER PUBLICATIONS

Katsunori Imamura et al., "Multi-core holey fibers for the long-distance (>100 km) ultra large capacity transmission," 2009, OSA/OFC/NFOEC, 3 pages.

* cited by examiner

*Primary Examiner* — Brian Healy
*Assistant Examiner* — Guy Anderson
(74) *Attorney, Agent, or Firm* — Drinker Biddle & Reath LLP

(57) ABSTRACT

A multi-core optical fiber 1A in which a plurality of cores can easily be identified even in the case where they are symmetrically arranged in its section has seven cores 10 to 16, a visual recognition marker 20, and a shared cladding 30 enclosing the seven cores 10 to 16 and the visual recognition marker 20. The cores 10 to 16 and the visual recognition marker 20 extend along the fiber-axis direction. The respective refractive index of the cores 10 to 16 is higher than the refractive index of the cladding 30. The refractive index of the visual recognition marker 20 differs from that of the cladding 30. In the cross-section perpendicular to the fiber-axis, the cores 10 to 16 are arranged such that they have 6-fold rotational symmetry and line symmetry. The visual recognition marker 20 is arranged at a position which breaks such symmetry.

5 Claims, 4 Drawing Sheets

MULTI-CORE OPTICAL FIBRE

TECHNICAL FIELD

The present invention relates to a multi-core optical fiber in which a plurality of cores extending in a fibre-axis direction and used for transmitting light are covered with a shared cladding.

BACKGROUND ART

The multi-core optical fiber can transmit mass information, since each of the plurality of cores functions as an optically independent optical waveguide. Generally, in the cross-section perpendicular to the fibre-axis of the multi-core optical fibre, two or more cores are arranged in symmetry (rotational symmetry or line symmetry) (Non-patent Literature 1). Symmetrically arranging the plurality of cores makes it possible to arrange the cores with high density in the section of the multi-core optical fibre and to control the cross talk between cores.

FIG. 1 is a cross-section of a multi-core optical fibre 2 for a comparative example. In the multi-core optical fibre 2, seven cores 10 to 16 which extend along the fibre-axis direction are surrounded by a shared cladding 30. The core 10 is arranged at the center of the section of the optical fibre 2, and the six cores 11 to 16 are arranged at equal intervals on the circumference of a circle such that the core 10 is located at the center of the circle. That is, the seven cores 10 to 16 are arranged in a manner having 6-fold rotational symmetry.

In a case where two or more cores are symmetrically disposed in the section, the cores having symmetrical relations cannot be identified. In the multi-core optical fibre 2, the respective six cores 11 to 16 cannot be identified. Even if the six cores 11 to 16 differ in terms of the core diameter or the refractive index, it would be difficult to identify each of the six cores 11 to 16.

SUMMARY OF INVENTION

The object of the present invention is to provide a multi-core optical fibre in which each core can easily be identified even if two or more cores are symmetrically arranged in the section of the multi-core optical fibre.

To achieve the object, provided is a multi-core optical fibre having a plurality of cores, a visual recognition marker, and a shared cladding that encloses the plurality of cores and the visual recognition marker, wherein the plurality of cores and the visual recognition marker extend along the fibre-axis direction and the refractive index of the visual recognition marker is different from the refractive index of the cladding, and wherein in the cross-section perpendicular to the fibre-axis the plurality of cores are symmetrically arranged, and the visual recognition marker is arranged at a position that breaks such symmetry.

In the multi-core optical fibre of the present invention, it is preferable that the refractive index of at least a part of the visual recognition marker be higher than the refractive index of the cladding. Preferably, the normalized frequency of the visual recognition marker differs from the normalized frequency of the respective cores by 5% or more. Also, it is preferable that a peripheral part having a refractive index which is lower than the refractive index of the cladding be provided in the periphery of the visual recognition marker.

In the multi-core optical fibre of the present invention, it is easy to discriminate the respective cores since the arrangement of the plurality of cores and the visual recognition marker is not symmetrical as a whole even in the case where the plurality of cores are symmetrically arranged in the section.

MODE FOR CARRYING OUT THE INVENTION

Figure 1:
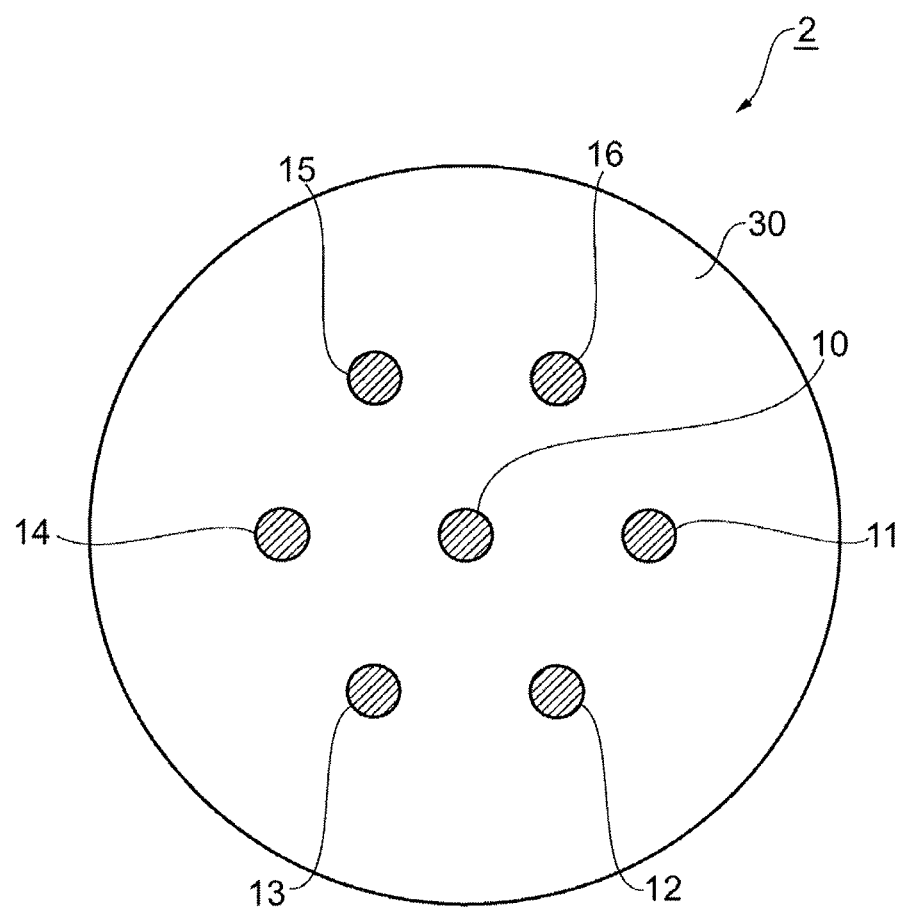
FIG. 1 is a cross-section that is perpendicular to the fibre-axis of a multi-core optical fibre for a comparative example.

Hereinafter, preferred embodiments of the present invention will be described in reference to the accompanying drawings. The drawings are provided for the purpose of explaining the embodiments and are not intended to limit the scope of the invention. In the drawings, an identical mark represents the same element so that the repetition of explanation may be omitted. The dimensional ratios in the drawings are not always exact.

Figure 2:
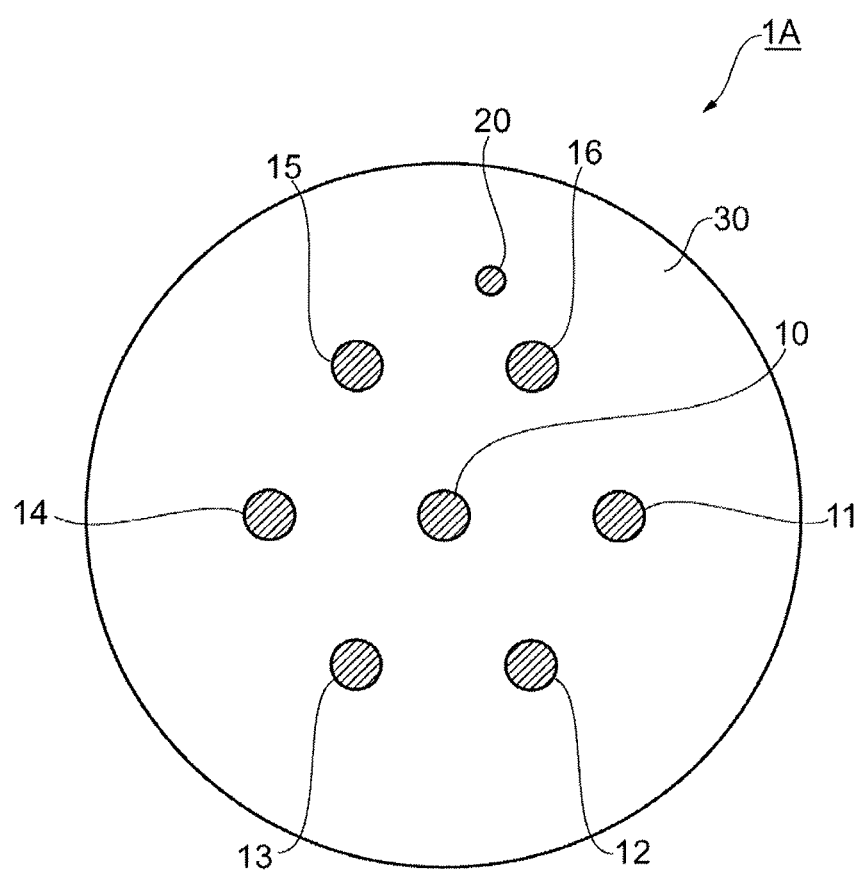
FIG. 2 is a cross-section that is perpendicular to the fibre-axis of a multi-core optical fibre in Embodiment 1 of the present invention.

FIG. 2 is a cross-section that is perpendicular to the fibre-axis of a multi-core optical fibre 1A in Embodiment 1 of the present invention. The multi-core optical fibre 1A has seven cores 10 to 16, a visual recognition marker 20, and a shared cladding 30 which encloses the seven cores 10 to 16 and the visual recognition marker 20. The cores 10 to 16 and the visual recognition marker 20 extend along the fibre-axis direction. The refractive index of each of the cores 10 to 16 is higher than the refractive index of the cladding 30. The refractive index of the visual recognition marker 20 differs from the refractive index of the cladding 30. The respective cross-section of the cores 10 to 16 and the visual recognition marker 20 is circular form.

The cores 10 to 16, the visual recognition marker 20, and the cladding 30 are respectively made of silica glass as their main element and an additive for adjusting the refractive index is added as needed. For example, the cores 10 to 16 and the visual recognition marker 20 are respectively $GeO_2$-doped silica glass, and the cladding 30 is pure silica glass. Or, the cores 10 to 16 and the visual recognition marker 20 are respectively pure silica glass, and the cladding 30 is F-doped silica glass, for example. It does not matter whether the core diameter of the cores 10 to 16 is the same or not. Also, it does not matter whether the refractive index of the cores 10 to 16 is the same or not.

In the cross-section perpendicular to the fibre-axis, the core 10 is arranged at the center, and the six cores 11 to 16 are arranged at equal intervals on the circumference of a circle such that the core 10 is disposed at the center of the circle. That is, the seven cores 10 to 16 are arranged in a manner having 6-fold rotational symmetry and line symmetry. The visual recognition marker 20 is arranged at a position that breaks such symmetry. The whole arrangement of the cores 11 to 16 and the visual recognition marker 20 is not symmetrical.

Figure 3:
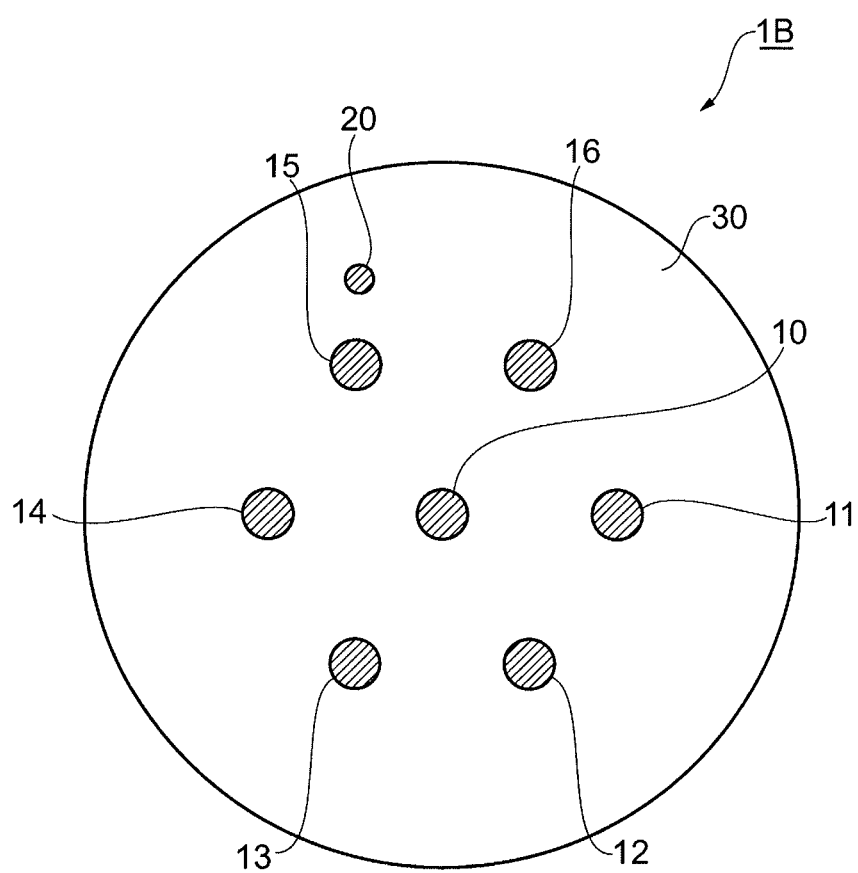
FIG. 3 is a cross-section that is perpendicular to the fibre-axis of a multi-core optical fibre in a modified example of Embodiment 1.

In order to make the whole arrangement of the cores 10 to 16 and the visual recognition marker 20 to be unsymmetrical, the marker 20 may only be arranged such that its distance from any arbitrary two cores of the cores 10 to 16 differs, for example. Or, as in a cross-section of the multi-core optical fibre 1B (shown in FIG. 3), the visual recognition marker 20 may be arranged on a line extending from the line connecting the core 13 and the core 15. By making such arrangement, the symmetry of cross-sectional structure of the multi-core optical fibre 1A is lost, and consequently the cores 10 to 16 can easily be discriminated by observing the section and detecting the position of the visual recognition marker 20.

In order to secure the visibility of the visual recognition marker 20, it is preferable that the refractive index of at least some region of the visual recognition marker 20 be higher than the refractive index of the cladding 30. By doing so, light can be propagated through the visual recognition marker 20, which results in increase of the visibility of the visual recognition marker 20. Also, in order to restrain the cross talk between the cores 10 to 16 and the visual recognition marker 20, it is preferable that the normalized frequency of the visual recognition marker 20 differ from the normalized frequency of any of the cores 10 to 16 by 5% or more.

Figure 4:
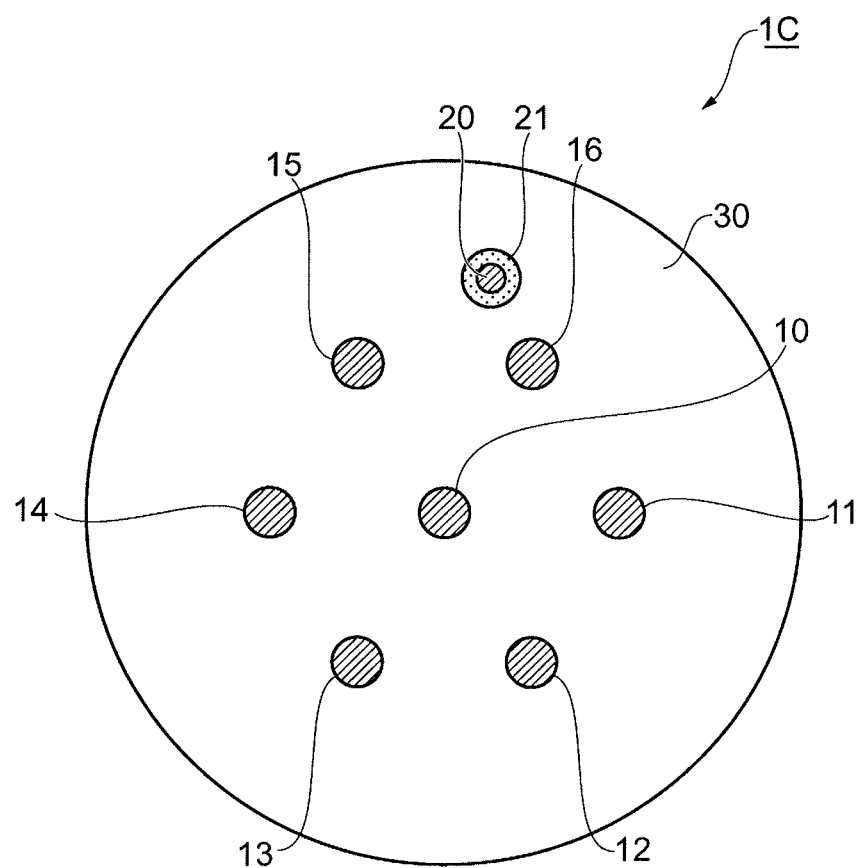
FIG. 4 is a cross-section that is perpendicular to the fibre-axis of a multi-core optical fibre in Embodiment 2 of the present invention.

FIG. 4 is a cross-section that is perpendicular to the fibre-axis of a multi-core optical fibre 1C in Embodiment 2 of the present invention. The multi-core optical fibre 1C has seven cores 10 to 16, a visual recognition marker 20, a shared cladding 30 which surrounds the cores 10 to 16 and the visual recognition marker 20, and a peripheral part 21 provided in the periphery of the visual recognition marker 20. The structure of the multi-core optical fibre 1C is different from that of the multi-core optical fibre 1A of Embodiment 1 in that the multi-core optical fibre 1C further includes the peripheral part 21.

The peripheral part 21 is formed in the periphery of the visual recognition marker 20 and has a refractive index that is lower than the refractive index of the cladding 30. For example, the cladding 30 is pure silica glass, and the visual recognition marker 20 is $GeO_2$-doped silica glass, and the peripheral part 21 is F-doped silica glass. In this way, the multi-core optical fibre 1C is enabled to generate the same effect as the multi-core optical fibre 1A, and moreover the cross talk between the cores 10 to 16 and the visual recognition marker 20 can be restrained.

The present invention is not limited to the above-mentioned embodiments, and various modifications are possible. For example, the core may be one that transmits light by the photonic band gap instead of the refractive-index difference between the core and the cladding. Also, the number of cores may be arbitrary rather than seven. The symmetry in the arrangement of cores in the section may be 4-fold symmetry instead of 6-fold symmetry. A plurality of visual recognition markers may be provided instead of one visual recognition marker.

INDUSTRIAL APPLICABILITY

With the multi-core optical fibre of the present invention, it is possible to identify a plurality of cores easily and correctly when wiring a multi-core optical fibre or connecting multi-core optical fibres with each other.

PRIOR ART LITERATURE

Non-Patent Literature

Non-patent literature 1: Katsunori Imamura, Kazunori Mukasa, Yu Mimura, Takeshi Yagi, "Multi-core holey fibers for the long-distance (>100 km) ultra large capacity transmission," OSA/OFC/NFOEC2009, OTuC3.

The invention claimed is:

1. A multi-core optical fibre having a plurality of cores, a visual recognition marker, and a shared cladding enclosing the plurality of cores and the visual recognition marker, wherein
   the plurality of cores and the visual recognition marker extend along the fibre-axis direction,
   the refractive index of the visual recognition marker is different from the refractive index of the cladding, and wherein
   in the cross-section perpendicular to the fibre-axis, the plurality of cores are symmetrically arranged, and the visual recognition marker is arranged at a position that breaks such symmetry.

2. A multi-core optical fibre as set forth in claim 1, wherein the refractive index of at least a part of the visual recognition marker is higher than the refractive index of the cladding.

3. A multi-core optical fibre as set forth in claim 2, wherein the normalized frequency of the visual recognition marker differs from the normalized frequency of the respective cores by 5% or more.

4. A multi-core optical fibre as set forth in claim 2, wherein a peripheral part having a refractive index lower than the refractive index of the cladding is provided in the periphery of the visual recognition marker.

5. A multi-core optical fibre as set forth in claim 3, wherein a peripheral part having a refractive index lower than the refractive index of the cladding is provided in the periphery of the visual recognition marker.

* * * * *